United States Patent [19]

Bosc et al.

[11] 3,778,604

[45] Dec. 11, 1973

[54] DIGITAL MEANS FOR COMPUTING FOURIER TRANSFORM OF A SERIES OF SAMPLES

[75] Inventors: Henri J. Bosc; Jean-Marie H. Colin, both of Paris; Jean-Claude A. Debuisser, Fontenay-le-Fleury, all of France

[73] Assignee: International Standard Electric Corporation, New York, N.Y.

[22] Filed: Dec. 29, 1971

[21] Appl. No.: 213,249

[30] Foreign Application Priority Data

Dec. 29, 1970 France .............................. 7046963

[52] U.S. Cl. ............ 235/152, 235/156, 235/150.53

[51] Int. Cl. ........................ G06f 1/02, G06f 15/34

[58] Field of Search ...................... 235/150.53, 152, 235/156, 197; 343/5 DP, 7.7, 17.1 R; 340/15.5 DP; 324/77 B; 328/17

[56] References Cited

UNITED STATES PATENTS

| | | | |
|---|---|---|---|
| 3,636,333 | 1/1972 | Klund | 235/156 |
| 3,586,843 | 6/1971 | Sloane | 235/150.53 X |
| 3,610,901 | 10/1971 | Lynch | 235/152 |
| 3,529,142 | 9/1970 | Robertson | 235/150.53 X |
| 3,573,446 | 4/1971 | Bergland | 235/156 |

*Primary Examiner*—Malcolm A. Morrison
*Assistant Examiner*—James F. Gottman
*Attorney*—C. Cornell Remsen, Jr. et al.

[57] ABSTRACT

A digital computer device for computing an approximation of the Fourier transform of a sequence of m sample pairs having known times of occurrence. An equation expressing the transform is programmed into the computer device. Binary words representing multiplier coefficients are placed in a first cyclically read memory. The m sample pairs are coded into p-digit words in a second memory from which they are simultaneously available. At each first memory reading 2 m multiplier coefficients are applied at the same time as the 2 m sample binary words to 4 m multipliers. The p-digit multiplier outputs are applied to a plurality of binary adders to perform the algebraic additions required by the equation. The device is particularly adapted for computation of Fourier transform approximations in a received signal processing system for a coherent pulse Doppler radar.

3 Claims, 16 Drawing Figures

Inventors
Henri J. Bosc
Jean-Marie H. Colin
Jean-Claude A. Debuisser
By William T. O'Neil
Agent Inventors
Henri J. Bosc
Jean-Marie H. Colin
Jean-Claude A. Debuisser
By William T. O'Neil
Agent Inventors
Henri J. Bosc
Jean-Marie H. Colin
Jean-Claude A. Debuisser
By William T. O'Neil
Agent Inventors
Henri J. Bosc
Jean-Marie H. Colin
Jean-Claude A. Debuisser
By William T. O'Neil
Agent Inventors
Henri J. Bosc
Jean-Marie H. Colin
Jean-Claude A. Debuisser
By William T. O'Neil
Agent

DIGITAL MEANS FOR COMPUTING FOURIER TRANSFORM OF A SERIES OF SAMPLES

CROSS-REFERENCE TO RELATED APPLICATIONS

This application is filed under the provisions of 35 U.S.C. 119 with claim for the benefit of the filing of an application covering the same invention filed Dec. 29, 1970, Ser. No. 70 46963, in France.

BACKGROUND OF THE INVENTION

1. Field of the Invention

The present invention relates generally to computer aided mathematical problem solution and more specifically, to digital computer instrumentation for derivation of an approximate Fourier Transform (representing frequency spectrum) of a complex function in repetitive electrical signal form.

2. Description of the Prior Art

It is known, and can be shown mathematically, that the Fourier transform of a signal $Z(t)$, having amplitude and phase varying with time, describes the frequency spectrum of that signal. Accordingly, frequency spectrum analyzing instruments have utilized that mathematical fact.

In the radar arts, the so-called coherent pulse Doppler systems provide signal processing to eliminate nonmoving targets from the echo video train. In that process, transmitted pulse energy phase is "remembered" by a coherent oscillator throughout each pulse repetition interval (the time between successive transmitted pulses) and received signals are compared in a phase detector or phase discriminator with the coherent oscillator phase. For moving targets, the phase detector output consists of pulses which are effectively amplitude modulated at the Doppler frequency. A known and so-called range selector circuit includes a range gating arrangement such that the aforementioned phase detector output can be processed through MTI filters, which pass only the Doppler components. A narrow range increment pulse corresponding to the range increment in which each corresponding Doppler modulated signal occurs can then be remodulated to "recreate" the moving target signals without the non-moving signals which normally appear in the unprocessed phase detector output.

In order to provide for improved MTI filtering (clutter rejection) and also to provide a basis for more complete identification of the nature of moving targets detected, computation of Fourier transforms as herein described is required. The nature of systems utilizing that information is not directly part of this invention. A pertinent prior art reference which deals with actual utilization of Fourier transforms in a coherent pulse Doppler radar system, however these are derived, is supplied in French Pat. application 70-14789 filed Apr. 23, 1970.

French Pats. Nos. 1,438,257 and 1,515,000 provide further background information with respect to coherent pulse Doppler radar systems of the uniform PRF and non-uniform pulse interval types, respectively.

SUMMARY OF THE INVENTION

The present invention deals with a unique system, involving certain approximation techniques, for generation of the Fourier transform of a complex function in electrical signal form. The device operates sufficiently rapidly to be adapted to coherent pulse Doppler radar system phase detector output signal processing. The said complex function, in that case, provides a sequence of simultaneously available samples, and the circuit of the invention generates an electronic signal of amplitude representing the frequency spectrum of the sample sequence.

Frequency spectrum analyzers are usually of an analog type, however, those skilled in this art would realize that a digital computer could be programmed for computing the desired Fourier transform, but it is not obvious how such an instrumentation could be applied to the radar data processing case in view of the time delays represented. In the radar case, the processing must be accomplished essentially in real time.

Accordingly, it may be said to be the general object of the present invention to provide a numerical Fourier transform computation with sufficiently fast operation to satisfy the aforementioned radar system requirement.

In the computer device according to the invention, computation speed is increased by simplifying the computation, the sine and cosine components of the exponential term $e^{-2\pi jft}$ being approximated by the four specific amplitude values $+1, +\frac{1}{2}, -\frac{1}{2}, -1$. In such an approximation, the multiplication of the binary word characterizing the sample amplitude by the binary word characterizing the exponential term consists in a direct transfer, a sign inversion, a shifting by one step, or a shifting by one step plus a sign inversion.

In situations where the computation speed is of primary importance, the means preferably used for instrumenting the computer device comprise a first memory wherein the $2m$ binary words characterizing the real and imaginary components of the $m$ samples of the analyzed signal are stored, a second memory wherein are stored the $2m(w+1)$ two bit binary words characterizing the multiplier coefficients where $(w+1)$ is the number of transform points to be computed, a series of $4m$ multipliers associated with registers, and a plurality of adders aranged arranged a pyramidal manner also with associated registers.

The function of the second memory, which contains the $2m(w+1)$ multiplier coefficients, may be provided alternatively by a numerical computer circuit computing the said coefficients from the $m$ values of the initial phase stored in a first cyclically read auxiliary memory and from the $m$ values of the phase increments stored in a second cyclically read auxiliary memory. This computer circuit for the multiplier coefficients includes, in addition to the first and second auxiliary memories, a third cyclically written and read auxiliary memory, $m$ adders and $2m$ decoders for the $q$ most significant figures of the binary words characterizing the phase (where $2q$ is the number of phase intervals).

If a longer time for computation is available, the multiplier coefficient computer circuit includes, in addition to the first, second and third auxiliary memories, a single adder and two decoders for the q most significant figures of the binary words characterizing the phase. In addition, the 4m multipliers, as well as the plurality of adders and registers may be replaced by two identical devices, one computing the real component and the other the imaginary component. Each of those devices comprises a multiplier, an adder with a feedback loop (including a register and an electronic gate), and an output register.

The above mentioned and other features and objects of this invention will become apparent by reference to the description hereinafter, taken in conjunction with the accompanying drawings.

DESCRIPTION OF THE PREFERRED EMBODIMENTS

Figure 1:
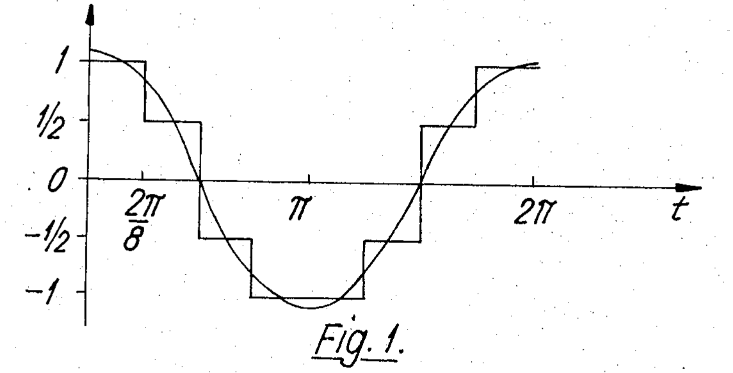
FIG. 1 illustrates the process of approximation of a cosine wave by a step-shaped function.

A complex function Z($t$) includes a real part X($t$) and an imaginary part Y($t$). If that function is sampled at $m$ times $tl \ldots ti \ldots tm$ the sampled complex function can be written as:

$$Z'(t) = \sum_{i=1}^{m} Z(t)\cdot\partial(t-ti),$$

the Dirac function being $\delta(t)$.

The Fourier transform T($f$) of Z'($t$) is then defined by $$T(f) = \int_{-\infty}^{+\infty} Z'(t)\cdot e^{-2\pi jft}dt = \int_{-\infty}^{+\infty}\sum_{i=1}^{m} Z(t)\cdot\partial(t-ti)\cdot e^{-2\pi jft}dt,$$

$j$ being the imaginary term (such that $j^2 = -1$).

T(f) may also be written $$\sum_{i=1}^{m}\int_{-\infty}^{+\infty} Z(t)\cdot\partial(t-ti)\cdot e^{-2\pi jft}dt.$$

According to a feature of the Dirac function, one can write $$\int_{-\infty}^{+\infty} A(t)\cdot\partial(t-ti)dt = A(ti), \quad \text{hence}$$

$$T(f) = \sum_{i=1}^{m} Z(ti)\cdot e^{-2\pi jfti} \qquad (1)$$

Equation (1) means that the Fourier transform of Z'($t$) at the frequency $f$ is given by a sum of $m$ terms each resulting from the product of the amplitude of Z($t$) at the time ti and the value of the exponential $e^{-2\pi jft}$ at the time ti. To obtain the frequency spectrum of Z'($t$), it is necessary to perform the said computation for a sequence of frequency values, i.e., $fo, \ldots fh \ldots fw$, uniformly distributed in the interval from $fo$ to $fo + w\cdot B$, where B represents the frequency band between two successive frequencies $fh$ and $fh + 1$. The value of B is selected depending on the accuracy required for the desired frequency spectrum. Thus, in the case where Z'($t$) corresponds to a signal provided by the phase discriminators of a coherent pulse Doppler radar for a range increment, B will be (for example) equal to the 3 dB bandwidth of a spectrum line.

For the frequency fh, equation (1) is written:

$$T(fh) = \sum_{i=1}^{m} Z(ti)\cdot e^{-2\pi j(fo\cdot ti + h\cdot B\cdot ti)} = \sum_{i=1}^{m} Z(ti)\cdot e^{-j(Pi + h\cdot pi)} \qquad (2)$$

with $2\pi\, fo\cdot ti = $ Pi and $2\pi\, B\cdot ti = pi$, or $$T(fh) = \sum_{i=1}^{m}[X(ti)\cdot\cos(-Pi - h\cdot pi) - Y(ti)\cdot\sin(-Pi - h\cdot pi)] + j\sum_{i=1}^{m}[X(ti)\cdot\sin(-Pi - h\cdot pi) + Y(ti)\cdot\cos(-Pi - h\cdot pi)] \qquad (3)$$

Thus, the set of arithmetic operations required for computing the Fourier transform of Z'($t$) in an interval from $fo -$ B/2 to $fo +$ wB + B/2 may be provided by a digital computer of the general purpose type. However, such a solution leads to a relatively long spectrum computation time which is not compatible with some applications, particularly in the case of processing a signal provided by a coherent pulse Doppler radar.

Figure 2:
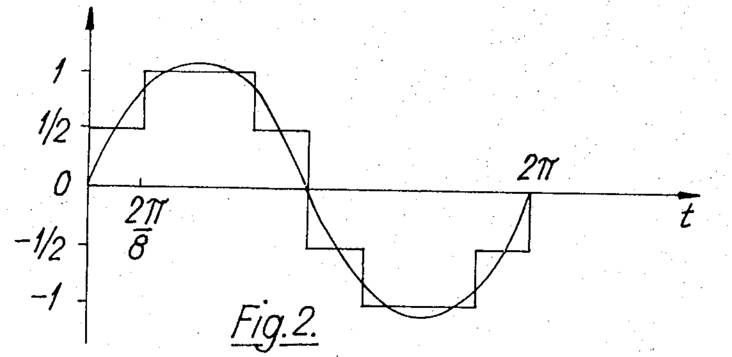
FIG. 2 illustrates the same type of approximation by a step-shaped function, in this instance of a sine wave.

According to the present invention, it is proposed to reduce the computation time by approximating the exponential term to some specific values, the said values having as cosine and sine components +1, +½, −½ and −1. The FIGS. 1 and 2 show the values of the cosine and sine curves and of their step approximations as a function of phase, the said steps having the values +1, +½, −½ and −1. It can be shown that such step-functions correspond to a sine or a cosine curve at the fundamental frequency which has a peak value of 1.085.

Figure 3:
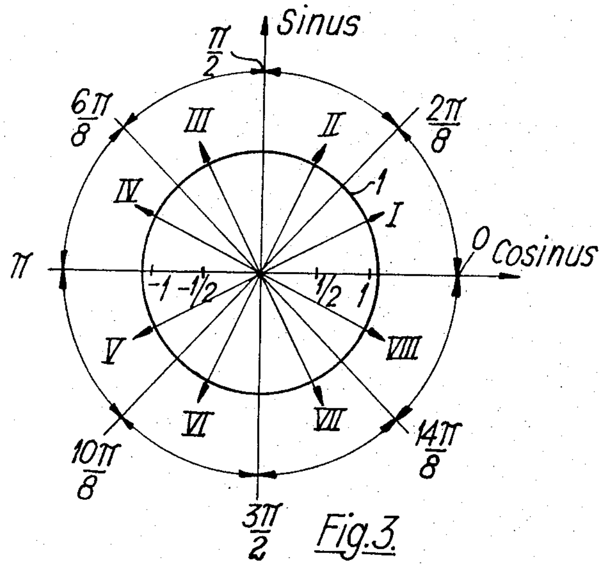
FIG. 3 is a vectorial illustration of the vector $e^{-2\pi jft}$ for various specific phase values.

In FIG. 3, the circle 1 of radius 1.085 illustrates the locus of the ends of the vector representing the fundamental frequency exponential term when the phase varies from 0 to $2\pi$. Vectors I, II, III, IV, V, VI, VII, VIII, also shown, correspond to the approximation values +1, +½, −½ and −1 of the sine and cosine components. Thus, when the phase -Pi-h·pi has a value lying between 0 and $2\pi/8$, the vector representing the exponential term will be the vector I. It will be noted that the locus of the ends of the vectors I–VIII is a circle of radius 1.118.

Referring to equation (3), the approximation results in simplifying the binary product of Z(ti) by the exponential term. The said product, consists, for each sine or cosine component, either in the unmodified binary word itself defining X(ti) or Y(ti) (value +1), the word with the sign thereof changed (value −1), the word shifted by one step (value + ½), or the word shifted by one step and also with changed sign (value −½).

Figure 4:
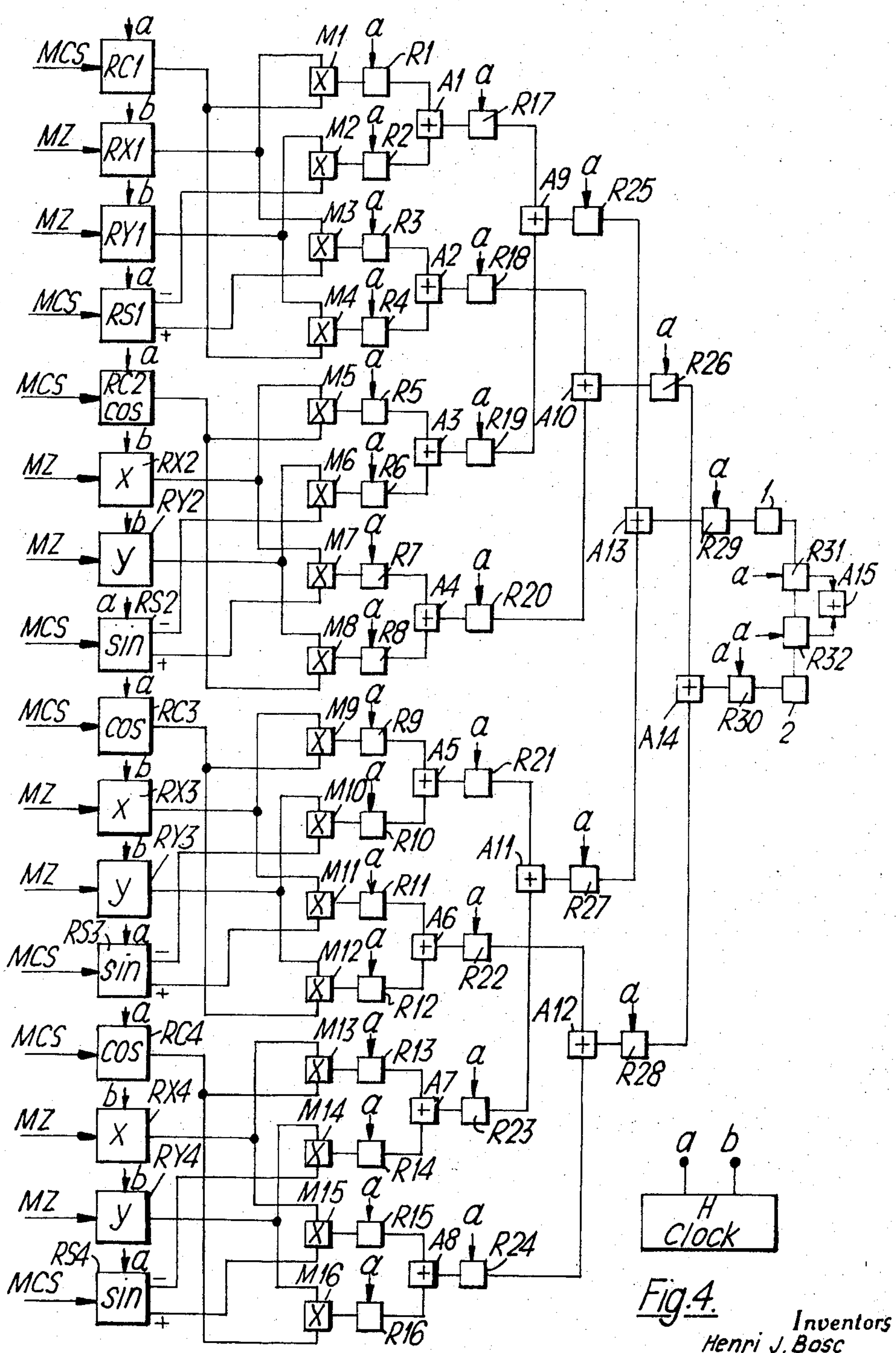
FIG. 4 shows a specific embodiment of a device according to the invention.

FIG. 4 shows the block diagram of a computer circuit for the Fourier transform of a function Z(t), the real and imaginary components of four samples of which are known at the times $tl$–$t4$. It will be assumed that the said components are available in the form of p-digit binary words in eight registers RX1-RX4 for the component X, and RY1-RY4 for the component Y. The approximation values of the sine and cosine components of the exponential term for computing a point of the Fourier transform are also available in eight registers RC1-RC4 (for the cosine approximation) and RS1-RS4

(for the sine approximation), in the form of 2-digit binary words.

In addition to the above mentioned registers, the computer device of FIG. 4 includes a set of multipliers M1-M16 which will be described in relation with the FIG. 7, a plurality of registers R1-R32 each comprising p flip-flops, a plurality of adders A1-A15 and a clock circuit H providing the signals *a* and *b* shown in the FIGS. 6(*a*) and 6(*b*).

In any case, it is possible to have the same times ti from a signal Z(t) to another one and, therefore, the $m(w+1)$ values of the phase ($4(w+1)$ in the case of the FIG. 4) needed for computing the $(w+1)$ points of the Fourier transform will be the same whatever the analyzed signal is. The $2m(w+1)$ cosine and sine approximation values are then stored in a memory MCS, not shown in FIG. 4. That memory is cyclically read so as to have $2m$ binary words (eight in the circuit of FIG. 4) appearing at each read operation, the said binary words being registered in the registers RC1-RC4 and RS1-RS4.

The $2m$ samples of the next analyzed signal Z(t) must be available in a memory MZ, not shown in FIG. 4, so as to be simultaneously registered in the registers RX1-RX4 and RY1-RY4 as soon as the last point on the transform of the preceding signal has been computed. The $2m$ first cosine and sine approximation values are registered at the same time as the samples into the registers RC1-RC4 and RS1-RS4.

Figure 5:
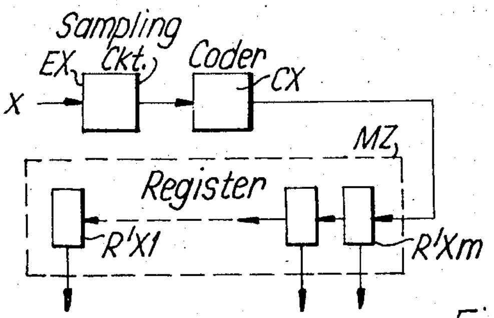
FIG. 5 shows a typical form of coder for the analyzed signals.

FIG. 5 shows how the binary words characterizing the sample amplitude are obtained. The two components, one real X(t) and the other imaginary Y(t) of the analyzed signal Z(t) are each applied to a sampling circuit EX or EY, followed by a coder CX or CY which provides the p-digit binary words (for example $p=9$).

It is known that the sampling pulse frequency Fe must be at least equal to twice the maximum spectrum frequency Fm if there is to be no loss of information from the Z(t) signal. Indeed, the signal sample spectrum is a sequence of line groups centered on the frequencies nFe, n having the values 0, 1, 2, 3.... Each line group covers a band Fm then representing the spectrum of the signal Z(t). There is no information loss if the line groups are not overlapping, i.e., if Fe ⩾ 2Fm. Thus, in the device of the invention, it is sufficient to select the computation interval w(+1)B centered on the frequency Fe or a multiple thereof for obtaining the spectrum of Z(t).

When the device of the invention is used for processing a signal provided by a coherent Doppler radar having recurrent pulses of frequency Fr, the maximum Doppler frequency which can be determined is Fr/2 (half of the PRF) and the measurement interval (w+1)B is FR/2 on one each side of the frequency nFr. It will be noted that, in that application the signal Z(t) is not considered, but the sampled signal Z'(t) corresponding to the signal returned by the target and, more generally, by a range increment during several successive radar repetition periods,is of interest. In that situation, the two components X(t) and Y(t) are provided by coders at the range gate output. Each range gate receives the output signal of two phase discriminators. These discriminators are operated against references in time-quadrature (90° phase relationship). Each range gate is equivalent to the sampling circuit EX or EY of FIG. 5 and receives pulses of frequency Fr delayed with respect to the transmission pulses by a duration corresponding to the range of the range increment of interest.

The device according to the invention is also applicable to the case where sampling times ti are not recurrent. In that situation (such as staggered or radomized PRF radar systems) the spectrum obtained in the interval fo−B/2 and fo+B/2+wB is the one of the samplings Z'(t) in the said interval and it is not possible to recognize the spectrum of Z(t). This is true, for example, when the signals X(t) and Y(t) are delivered by the two phase discriminators of a coherent pulse Doppler radar wherein the transmission pulses are separated by unequal time intervals (as in the non-uniform PRF case above), the signals X(t) and Y(t) corresponding to a range increment being located at a predetermined range from the radar antenna. In this case, sampling signals applied to the circuits EX and EY correspond to the transmission signals, delayed, however, by a time corresponding to the range increment location (range-time delay equivalent).

By way of example and for convenience in the following description, it will be assumed that amplitude coding is effected from a reference level corresponding to the maximum negative amplitude. Thus, the code 000000000 corresponds to the reference level, the code 100000000 to the null amplitude and the code 111111111 to the maximum positive amplitude. As a result, the most-significant digit corresponds to the sign of the sample. Moreover, for codes corresponding to positive amplitudes, the eight less-significant digits give, in pure binary code, the absolute sample value. Conversely, for codes corresponding to negative amplitudes, the eight less-significant digits must be complemented in order to correspond to the absolute value. The derivation of the said complement will be taken into account in the multipliers.

Each binary word outgoing from CX or CY (FIG. 5) is stored in the memory MZ. By way of example, the memory MZ may comprise two parts, each consisting of m registers (R'X1-R'Xm and R'Y1-R'Ym) interconnected so as to perform transfer from each register to the next, the said transfer being made for every stored bit in the register R'Xm or R'Ym.

When using the device of the invention for processing a signal provided by a coherent Doppler radar having recurrent or non-recurrent pulses, it would be evident to the designer to use two memories alternately oeprated for writing or reading. The selection circuits for the said memories would be designed so as to write along one of the *m* memory lines, the binary words coded during the interval between two transmission pulses (or during a part of the said interval) and simultaneously to read the $2m$ binary words of a column, the $2m$ binary words of a column corresponding to a single range increment. Each memory has as many output registers as binary words included in a column. Memory organizations of that type are described in the patent literature relating to digital coherent pulse Doppler radar systems.

It will be noted that, for non uniformly recurrent transmission pulses, it is necessary to transmit them in accordance with a repetition program such that the times ti are the same from one column to the next.

Such a two-memory system is described, particularly in French Pat. No. 1,438,257, with respect to a coherent recurrent pulse Doppler radar and in the French Pat. No. 1,515,000 with respect to a coherent non-uniformly recurrent pulse Doppler radar.

In FIG. 4, the output leads of the registers RX1-RX4, RY1-RY4, RC1-RC4, RS1-RS4 are connected to a set of multipliers M1-M16, the connections being so arranged that each multiplier makes a single multiplication from among thos indicated to be performed in equation (3).

The four multiplier coefficients are coded according to a two-digit binary word in accordance with Table 1. The first digit s is alloted to the sign and the second digit c to the multiplier coefficient value.

TABLE I

| Coefficient | s | c |
|---|---|---|
| +½ | 1 | 1 |
| +1 | 1 | 0 |
| −½ | 0 | 1 |
| −1 | 0 | 0 |

Figure 7:
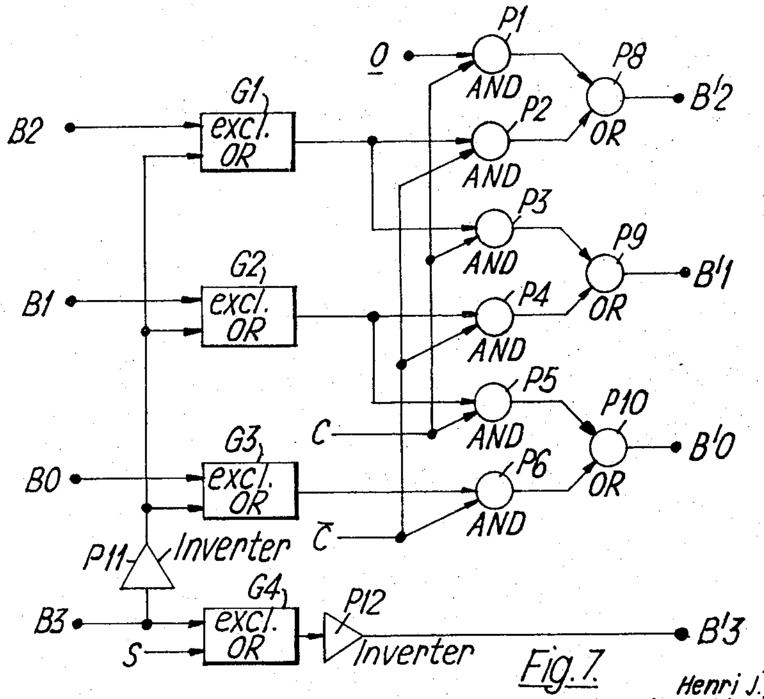
FIG. 7 shows a multiplier circuit used in the device of the present invention.

FIG. 7 shows the circuit of a multiplier where it is assumed that the binary word characterizing the sample amplitude includes four digits BO -B3 wherein B3 is the most significant and determines the sign. The multiplication is obtained by separately effecting the multiplication of signs (digits B3 and S) and the absolute value multiplication (on the one hand, digit c and, on the other hand, digits B0, B1, and B2 complemented or not). As shown in FIG. 7, each multiplier comprises the AND circuits P1-P6, the OR circuits P8-P10, the inverter circuits P11 and P12 and the exclusive OR circuits G1-G4.

The exclusive OR circuits G1-G4 are identical, and G4 performs the logic function $B3\cdot\overline{s}+\overline{B3}\cdot s$. By adding an inverted circuit P12 at the output of G4, the sign multiplication is effected.

The exclusive OR circuits G1-G3 perform complement computation for the digits B0-B2 when B3 is the digit 0, i.e., when amplitude is negative. In the opposite case, there is no complement generation.

The electronic gates P1-P10 make it possible to multiply the absolute value of the sample and of the coefficient (digit c). Thus, multiplication by 1 (digit $c=0$) is obtained by a direct transfer of the digits B0-B2 via the AND circuits P2, P4 and P6, switched on by the signal $\overline{c}$. Multiplication by ½ (digit c) is effected by shifting the digits B2 and B1 toward the next lower rank while the digit B0 is not transmitted and while the digit B2 is replaced by a 0. Shifting is effected via the AND circuits P1, P3 and P5 controlled by the signal c.

Figures 6A, 6B, 6C:
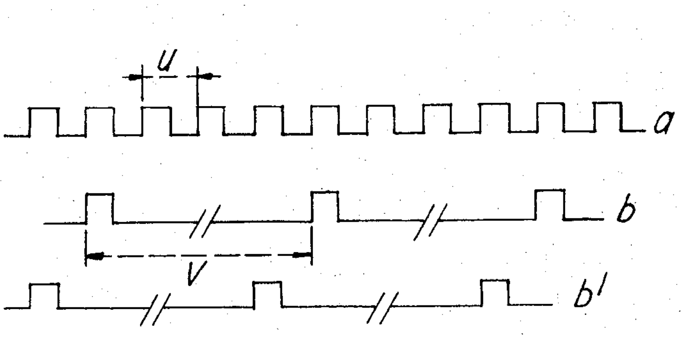
FIGS. 6(*a*) to 6(*c*) show signal waveforms used for controlling certain circuits of FIG. 4.

Each multiplier M1-M16 is followed by a register R1-R16, wherein flip-flops are switched into the condition dictated by the output leads of the multiplier when the signal a [FIG. 6(a)] is applied thereto.

The binary words of the registers R1-R16 are two and two added in the adders A1-A8, each pair of binary words corresponding either to the real component or to the imaginary component. Each adder A1-A8 is followed by a register R17-R24 controlled by the signal a. The binary words of the registers R17-R24 are added, in a same manner, in the circuits A9 and A11 for the real component, and in the circuits A10 and A12 for the imaginary component, the said adders being followed by the registers R25-R28. Finally, the binary word characterizing the real component is provided by the adder A13 with which the register R29 is associated; while the binary word characterizing the imaginary component is provided by the adder A14 with which the register R30 is associated.

In fact, each adder A1-A14 is designed so as to effect the half-sum of the binary numbers which are applied to it so that every register of the FIG. 4 arrangement includes p=0 flip-flops.

The binary words included in the registers R29 and R30 may be processed in several different manners. The most satisfactory processing would consist in computing the square root of the sum of the square of the real and imaginary components, but such a computation is time consuming and costly. Consequently, an approximate computation is often made by, for example, taking the sum of the real and imaginary component modules. In the described specific example, where coding is accomplished from a reference level corresponding to the maximum negative amplitude, the absolute value of the binary number is obtained by using the p−1 digits directly when positive or their complements when negative. Such an operation is effected on the output leads of the registers R29 and R30 via the electronic gates, schematically shown by the rectangles 1 and 2. The p−1 digit binary words characterizing the absolute value are installed in the registers R31 and R32, then added in the circuit A15.

The circuit of FIG. 4 operates as follows: For each signal b [FIG. 6(*b*)] formed by pulses of period v, the real and imaginary components of $m=3$ samples are stored in the registers RX1-RX4 and RY1-RY4 as they are provided from the memory MZ. For each signal a, formed by pulses of period $u$, the $2m$ multiplier coefficients provided from the memory MCS are stored in the registers RC1-RC4 and RS1-RS4. The various multiplication and addition operations are processed at the pulse rate of the signal a having a period $u$ equal to or longer than the longest operation time in the chain. The order pulse $(w+1)$ of the signal a permits registering of the $2m$ coefficients needed for computing the last point of the transform and the next pulse appears synchronously with the next pulse of the signal $b$ permitting registration of the binary words of the samples. It will be seen that $v$ must be equal to $(w+1)u$.

The binary word provided at each pulse of the signal a by the adder A15 may be used in various manners. For example, it may be converted into an analog signal which is to be applied to a display unit of any known type such as a cathode ray tube wherein the sweep signal is synchronized with the signal *b*, but delayed in time.

By using a pyramidal parallel computation, the circuit of FIG. 4 permits a fast computation of the Fourier transform which is particularly appropriate when the signal to be analyzed is delivered by a radar, for example, a coherent pulse Doppler radar.

Figure 8:
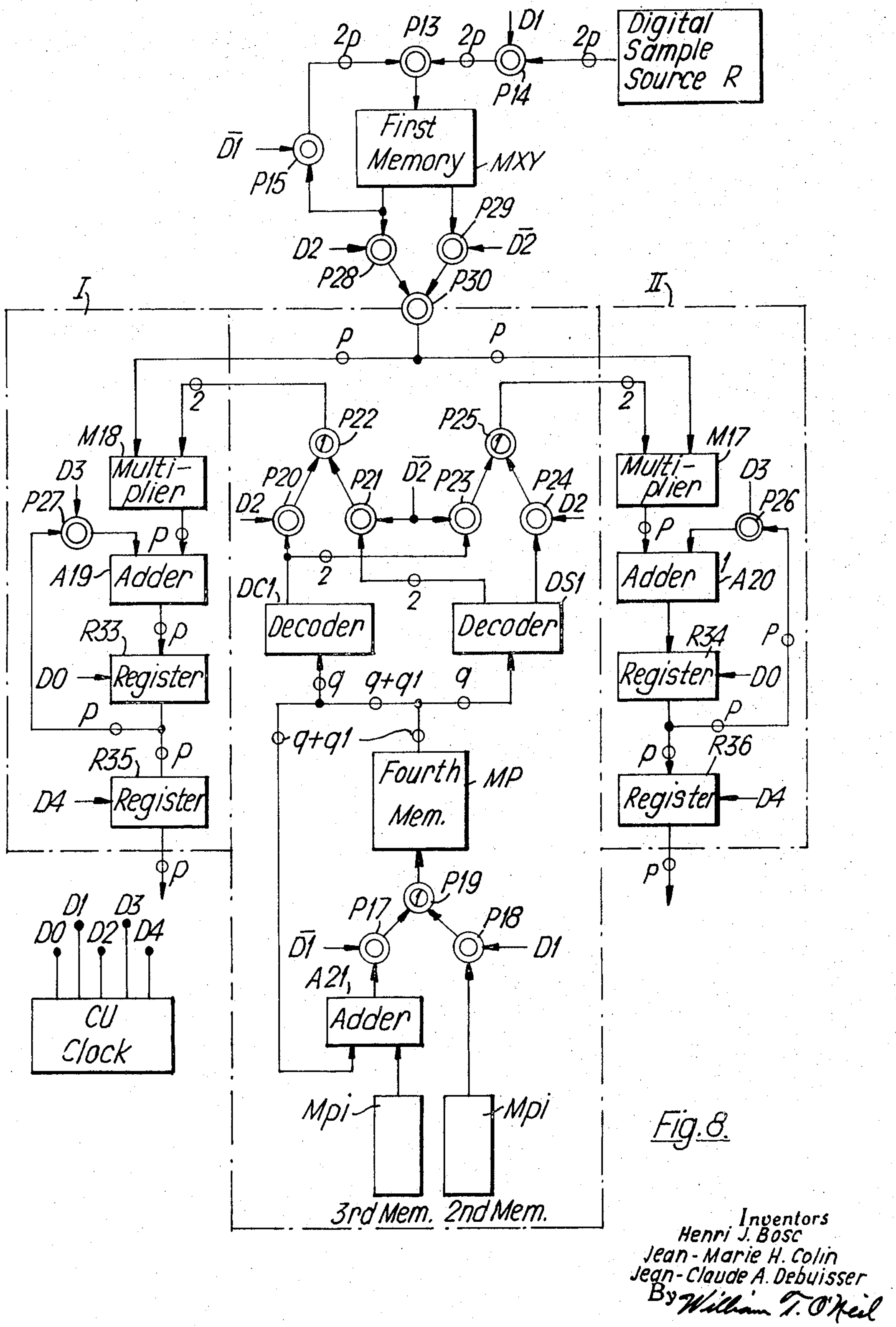
FIG. 8 shows another specific embodiment of a device according to the present invention.

For other applications wherein the computation time is not crucial, the circuit of FIG. 8 which provides a series computation may be used. The said circuit includes a first memory MXY wherein the binary words characterizing the amplitude of the $2m$ signal samples are stored, a second memory MPi wherein the $m$ binary words characterizing the m values of the initial phase Pi, [equation (3)], are stored, a third memory Mpi wherein the binary words characterizing the m phase increments pi are stored, a fourth memory MP wherein the binary words characterizing the $m$ intermediate phase values (−Pi−h·pi) are stored, two multipliers M17 and M18 identical to those of FIG. 4, adders A19, A20 and A21, registers R33-R36, decoders DC1 and DS1, a plurality of electronic gates P13-P30 interconnecting the above mentioned units, and finally, a clock circuit CU providing control signals D0-D4 for the electronic gates and registers.

The selection circuits of the memory MXY are designed so as to cyclically perform a read operation followed by a write or rewrite operation. Thus, if it is assumed that each pair of binary words characterizing a sample is stored in a line of the said memory, the line selection duration will permit a read operation followed by a write operation of the next sample if the signal D1 [FIG. 9(*b*)] applied to the AND circuit P14 makes it possible or by a rewrite operation of the sample if the signal $\overline{D1}$ applied to the AND circuit P15 makes it possible.

The memories MPi and Mpi are, when processing a signal wherein the times ti are the same from one cycle of m samplings to the next one, permanent memories, for example, cyclically read diode memories. For simplifying the description, it will be assumed that the said memories are read in synchronism while the nitial phase values Pi are only used during the signal D1 [FIG. 9(*b*)] applied to the electronic gate P18. The number of digits of the words characterizing the phases Pi and the phase increments pi depends on the number of coding intervals (eight in the described specific example) and on the number $w+1$ of the points of the computed Fourier transform. For determining the cosine and sine approximation values, only eight phase intervals have meaning (FIG. 3) and are defined by the 3(i.e. $q$=3) most significant digits of the phase (−Pi−h·pi). The number $q'$ of digits of the fractional part must be such that error on the last value (−Pi−w·pi) of the computed phase has no impact on the value of the integer part, i.e., that $2^{q'} > w$.

The memory MP is, for example, a ferrite core memory and may be organized in a manner similar to the memory MXY, i.e., a phase value per line. Its selection circuits can be identical to those of the memory MXY.

TABLE 2

| (-Pi-h·pi) between | Integer part of the binary number | cosine | sine |
|---|---|---|---|
| 0 and 2 π/8 | 000 | 10 | 11 |
| π/4 and π/2 | 001 | 11 | 10 |
| π/2 and 3π/4 | 010 | 01 | 10 |
| 3 π/4 and π | 011 | 00 | 11 |
| π and 5 π/4 | 100 | 00 | 01 |
| 5 π/4 and 3 π/2 | 101 | 01 | 00 |
| 3 π/2 and 7 π/4 | 110 | 11 | 00 |
| 7 π/4 and 2 π | 111 | 10 | 01 |

The decoders DC1 and DS1 to which are applied the signals of the 3 most-significant digits of the binary words read from the memory MP are designed to effect the transcoding defined in the above Table 2 concerning the phase integer part (−Pih·pi) and the pair of approximation values of the cosine (circuit DC1) and of the sine (circuit DS1).

The adders A19 and A20 are designed to produce the modulo $2^{p'}$sum of the values which are applied thereto with $p' = p + \log_2 m$, since the computation of each point includes the addition of m terms. However, only the p most significant digits are retained. The adder A21 is designed to form the modulo $2^{q+q'}$of the figures applied thereto.

The registers R33-R36 are p-digit registers wherein registraiton is controlled by the signal DO [FIG. 9(*a*)] with respect to R33 and R34 and by the signal D4 [FIG. 9(*e*)] with respect to R35 and R36.

The circuit of FIG. 8 operates as follows, assuming that the number of sample pairs to be processed is $m = 4$. The read signals of the various memories MXY, MP, MPi and Mpi are synchronized and their pulse period is the same as the period of the signal D0 pulses [FIG. 9(*a*)].

During the duration of the signal D1 [FIG. 9(]b)] applied to the multiple AND circuit P14, the $2m = 8$ binary words characterizing the amplitude of the samples X(t1)-X(t4) and Y(t1)-Y(t4) of the analyzed signal are stored in the memory MXY while the memory content is read without rewriting via the multiple AND circuit P15 and the multiple OR circuit P13. At each read operation, a pair of binary words is applied to the multiple AND circuits P28 and P29, respectively controlled by the signals D2 and $\overline{D2}$, i.e., the words X(ti) to the multiple AND circuit P28 and the word Y(ti) to the multiple AND circuit P29.

Figures 9A, 9B, 9C, 9D, 9E:
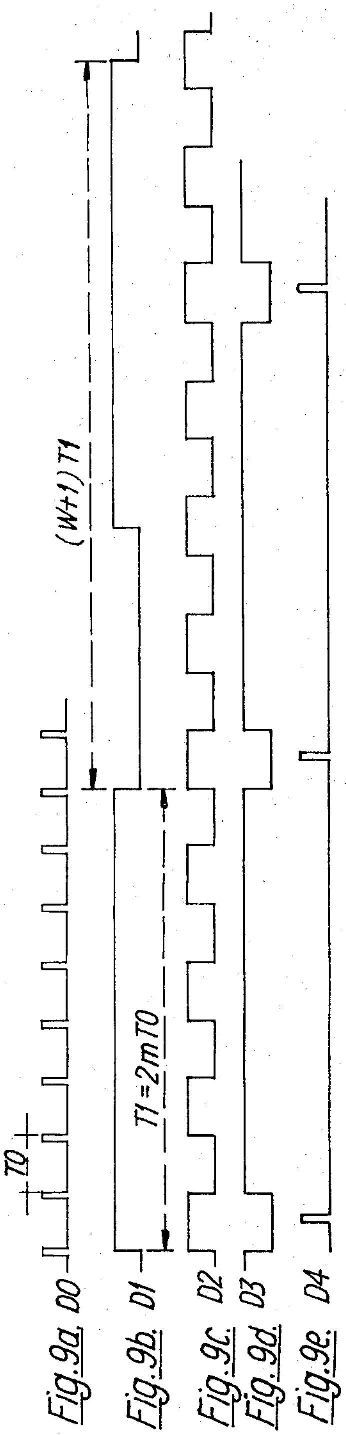
FIGS. 9(*a*) to 9(*e*) show wave forms of signals provided by the circuit CU of FIG. 8.

During the presence of the signal D1 [FIG. 9(*b*)], the Pi binary words characterizing the initial phase are transferred into the memory MP via the multiple AND circuit P18 and the multiple OR circuit P19. When the signal D1 terminates, the 3 most-significant digits of the binary words provides by the memory MP are decoded by the circuits DC1 and DS1 which then provide the two-digit codes defining the multiplier coefficients. These codes are then applied to the multipliers M17 and M18 via the electronic gates P20-P25 controlled by the signals D2 [FIG. 9(c)] and $\overline{D2}$.

During the presence of the signal D2, the multiplier M18 receives the binary word X(ti) and the cosine approximation code whle the multiplier M17 receives the binary word X(ti) and the sine approximation code. During the presence of the signal $\overline{D2}$, the circuit M18 receives the binary word Y(ti) and the sine approximation code, the sign thereof being changed, while the circuit M17 receives the binary word Y(ti) and the cosine approximation code. Referring to equation (3), it will be seen that the set of circuits within the rectangle I effects the computation of the real part while that of the rectangle II effects the computation of the imaginary part (see FIG. 8).

The circuits included in the rectangles I and II being identical, only operation of those of the rectangle I need be described. During the signal D2, the multiplier M18 delivers the binary word corresponding to the product resulting from the multiplication −Y(ti)·sin(−Pi−h·pi). The$2m$=8 binary words successively delivered by the multiplier M18 after the trailing edge of the signal D1 are added by means of the adder A19, enclosed in a feedback loop also including the register R33 controlled by the signal D0 [FIG. 9(*a*)] and the multiple AND circuit P27 controlled by the signal D3 [FIG. 9(*d*)]. As the multiple AND circuit P27, which is off for the duration T0, of the first signal D2 appearing after the trailing edge of the signal D1, the binary word characterizing the result of the multiplication X(ti)·cos(−Pi) is added to the figure 0 provided by the multiple AND circuit P27. After the eighth pulse $DO_8$ of the signal D0 appearing after the trailing edge of the signal D1, the binary word which appears in the register R33 is the result of the various additions defined by:

$$\sum_{i=1}^{4} X(ti)\cdot\cos\,(-Pi)-Y(ti)\cdot\sin\,(-Pi)$$

i.e., the real part of the first point of the transform ($h$=0). The pulse $D4_1$ of the signal D4 which immediately follows the eighth pulse $D0_8$ of the signal D0 transfers the result into the register R35.

At the same time $D4_1$, the binary word characterizing the imaginary part of the first point of the transform is transferred into the register R36 (rectangle II).

The phase values (−Pi−h·pi) for the remaining points of the transform are obtained by means of the binary words included in the memories Mp and Mpi and of the adder A21. The latter cyclically receives, from the memory MP, the phase (−Pi−h·pi) and the phase increment pi from the memory Mpi. The result of the addition −Pi−(h+1)pi is stored in the memory MP via the multiple AND circuit P17 and the multiple OR circuit P19.

In accordance with the above-described mode of operation, at each period T1 = 2$m$ T0=8T0, the registers R35 and R36 receive the binary words characterizing the real part and the imaginary part of a point of the transform, respectively.

After a time interval wT1 from the trailing edge of the first signal D1, a second signal D1 appears. During the presence of this second signal D1, the ($w$+1)th point of the transform is computed as the memory MXY and MP are changed, the first one with binary words of the second sampling cycle and the second one with binary words provided by the memory MPi. Thus, at the end of the second signal D1, the computation of another Fourier transform may be started.

The binary words provided by the registers R35 and R36 at each period may be used in the manner described in relation with the FIG. 4.

Figure 10:
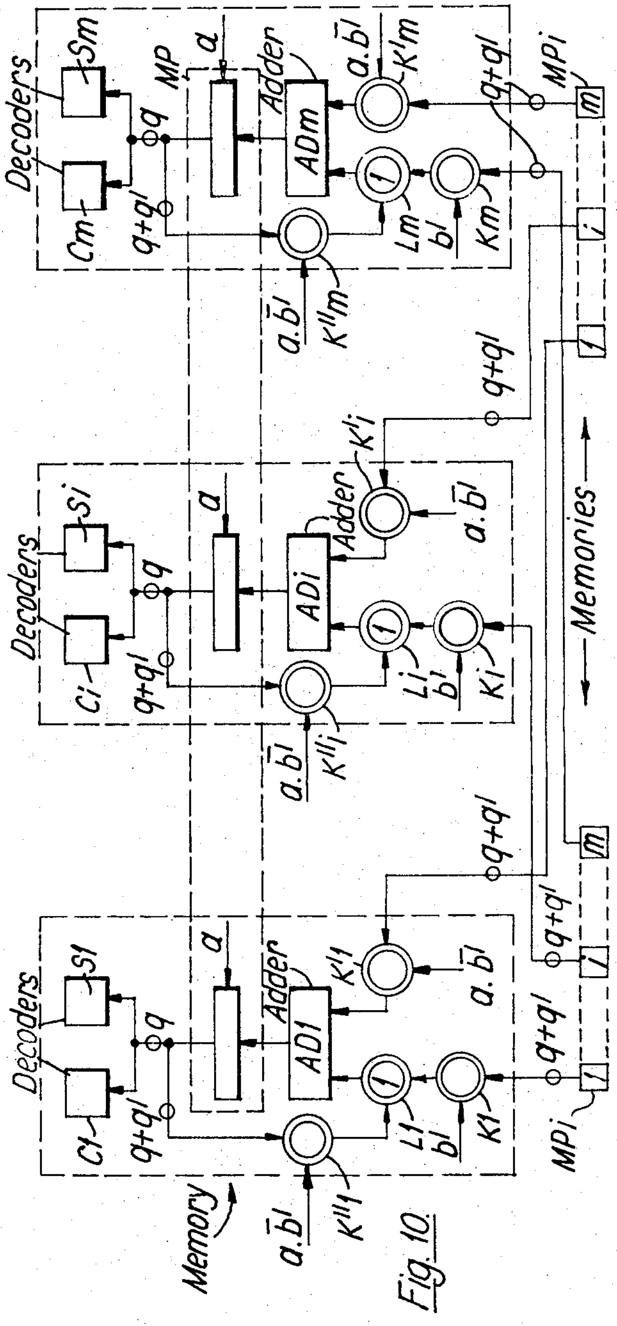
FIG. 10 shows a circuit capable of supplanting a part of the memory of the device of FIG. 4.

The device of FIG. 4 has been described assuming that the 2$m$($w$+1) multiplier coefficients were stored in a memory identified as MCS, not shown in FIG. 4. Such a memory MCS may be actually be replaced by a coefficient computation device similar to that described in relation with FIG. 8. FIG. 10 diagrams such a circuit. Some elements are identical to those described in relation with FIGS. 4 and 8 and are identified by the same reference numbers. So it is for the memory MPi for the initial phases Pi and for the memory Mpi for the phase increments pi, each including, for example, $m$ = 4 registers for ($q$+$q'$) digits. Also there is the memory MP including the intermediate phases (−Pi−h.pi) similarly comprising $m$ = 4 registers for ($q$+$q'$)digits. Concerning operation, it will be noted that, whereas in FIG. 8 computation was made in series, in FIG. 10 it is made in parallel. For performing the parallel computation, each pair of registers at corresponding locations in the memories MPi and Mpi, i.e., the registers which contain the corresponding phases Pi and pi, is connected to an adder ADi, identical to the adder A21 of FIG. 8, via a multiple AND circuit Ki controlled by the signal $b'$ [FIG. 6($c$)] with respect to the phase Pi and via the multiple AND circuit K'$i$ controlled by the signal $a\cdot\overline{b'}$ with respect to the phase pi. Each adder ADi is followed by a register of the intermediate memory MP, the ($q$+$q'$) outputs of the said register being connected to the input of the adder ADi. The latter receives the initial phase via the multiple AND circuit K''i controlled by the signal $a\cdot\overline{b'}$ and the multiple OR circuit Li. The $q$ output of each memory MP register which correspond to the most-significant digits are connected to two decoders Ci and Si identical with circuits DC1 and DS1 of FIG. 8. The two output wires of each decoder are connected to two multipliers, such a connection being such that the decoder C1 is connected to the multipliers M1 and M4 of FIG. 4.

While the principles of the above invention have been described in connection with specific embodiments aand particular modifications thereof, it is to be clearly understood that this description and the accompanying illustrations are presented by way of example and are not intended to limit the scope of the invention.

What is claimed is:

1. A Fourier transform digital computer device for processing a predetermined plurality m, of cylical sample pairs x(ti) and Y(ti) representative of the quadrature outputs of the phase detector of a coherent pulse Doppler Radar system receiver, said samples having known occurrence times ti for a frequency fh, according to the equation:

$$T(fh)=\sum_{i=1}^{m}[X(ti)\cdot\cos(-Pi-h\cdot pi)-Y(ti)\cdot\sin(-Pi-h\cdot pi)]+j\sum_{i=1}^{m}[X(ti)\cdot\sin(-Pi-h\cdot pi)+Y(ti)\cdot\cos(-Pi-h\cdot pi)],$$

where (−Pi−h·pi) defines the initial and incremental phase values corresponding to said m samples, comprising:

a first cyclically read memory containing 2$m$($w$+1) binary words defining coefficients of the sine and cosine terms of said equation, where ($w$+ 1) is the number of Fourier transform points to be computed;

second means comprising a second memory containing the 2$m$ p-digit binary words characterizing said $m$ sample pairs and means for reading said first and second memories simultaneously, said second means also including 4m multipliers responsive to data read from said first and second memories to effect simultaneous multiplication of terms of said equation; and a plurality of binary adders responsive to the outputs of said multipliers for contemporaneously performing the additions required by said equation.

2. Apparatus according to claim 1 in which said second means includes means assigning approximate values to the sine and cosine terms of said equation, said approximate values ranging between the values +1, + ½, − ½ and −1, said means being responsive to the value of said ($-P_i$−h·pi) angular term as a fraction of 2 $\pi$ radians to assign one of said approximate values to each of said sine and cosine terms in accordance with the value of said angular term at any time.

3. Apparatus according to claim 2 including means for providing said approximate values in two bit digital form ranging from 00 to 11, comprising eight discrete values, one each for each $\pi$/4 of said angular term.

* * * * *